United States Patent [19]
Wagner

[11] 3,846,059
[45] Nov. 5, 1974

[54] PLATE EXTRUDER

[76] Inventor: Claude Julien Rene Wagner, 50 Avenue du General Leclerc, Pont-a-Mousson, France

[22] Filed: July 19, 1973

[21] Appl. No.: 380,742

Related U.S. Application Data

[63] Continuation of Ser. No. 878,523, Nov. 20, 1969, abandoned.

[30] Foreign Application Priority Data
Nov. 28, 1968 France .............................. 68.175655

[52] U.S. Cl.......... 425/381.2, 264/176 C, 425/207, 425/378
[51] Int. Cl............................................... B29f 3/02
[58] Field of Search......... 264/176 C; 425/376, 378, 425/207, 381.2, 86

[56] References Cited
UNITED STATES PATENTS

| | | |
|---|---|---|
| 3,153,686 | 10/1964 | Adams .......................... 264/176 C |
| 3,411,180 | 11/1968 | Ledoux ........................ 425/381.2 X |
| 3,570,394 | 3/1971 | Christy et al. .................... 425/86 X |
| 3,611,490 | 10/1971 | Neuville et al................. 425/381.2 |

Primary Examiner—R. Spencer Annear
Assistant Examiner—Mark Rosenbaum

[57] ABSTRACT

A disc plate extruder formed of a rotor and stator in spaced parallel relation with the faces of the rotor and stator being provided with projections arranged in a spiral path with the projections in the rotor having an abrupt wall facing in the direction of rotation of the rotor while the projections in the stator have an abrupt wall facing in the opposite direction and in which the projections are either continuous or discontinuous in the respective faces of the rotor and stator and in which the rotor may include radial projections for displacing the material to be extruded into the gap between the rotor and stator.

15 Claims, 3 Drawing Figures

PATENTED NOV 5 1974 3,846,059

INVENTOR.
CLAUDE JULIEN RENE WAGNER
BY
McDougall, Hersh, Scott & Ladd ATTYS

PLATE EXTRUDER

This is a continuation of application Ser. No. 878,523, filed Nov. 20, 1969 now abandoned.

This invention relates to an apparatus embodying plates which impart a shearing action for the extrusion of plastic or elastomeric materials and which is particularly adapted for the extrusion of rigid polyvinyl chloride.

Apparatus of the type described is formed of two coaxial or nearly coaxial disc plates one of which, referred to as the stator, is a stationary plate fixed to the body of the apparatus, and the other, referred to as the rotor, is mounted for rotational movement about an axis common with the stator but with a spaced relationship therebetween, called gap, in which the material to be extruded is sheared, gelled and homogenized in response to rotational movement of the rotor relative the stator. The material is introduced in granular, powdered or particulate form into the gap between the plates through a feed opening, usually located at the periphery, and is converted into a sort of thin cake which is displaced by centripetal force inwardly toward an axial die opening in the center of the stator, through which the material is extruded.

The difficulty with a disc plate extruder of the type described resides in the inability to obtain uniform operation of the apparatus from the standpoint of uniform operation of the rotor, constant output, uniform temperature and uniformity in the cross-section of the material extruded. Known apparatus, having plates formed with a smooth surface or with grooved surfaces, or ribbed or bladed plates do not permit uniform operation to be obtained. The extrusion varies in composition in cross-section and the output is irregular such that it becomes unsuitable for use in molding, such as in blow molding. The output is often times momentarily or permanently stopped.

The observation of applicant indicates that such irregular operation may be attributed, at least in part, to slippage between the plates and the plastic material and that, in the absence of such slippage, operation becomes much more uniform.

Thus it is an object of this invention to produce a plate type extruder which is capable of extrusion of material at a uniform rate and composition.

These and other objects and advantages of this invention will hereinafter appear and for purposes of illustration, but not of limitation, embodiments of the invention are shown in the accompanying drawings in which FIG. 1 is a sectional elevational view of an apparatus embodying the features of this invention;

In accordance with an important feature of this invention, the stator or the stator and rotor are formed with abutments in the form of ribs or projections which extend from their faces to a height which is less than the width of the gap so that a significant clearance exists between the top lands or peaks of said projections on the stator and/or the rotor.

Due to the projections, the plastic material is held to the plates without slippage therebetween. As a result, the shearing action in the thin cake between the plates is enhanced and the material is extruded at a uniform rate and in more uniform composition in cross-section.

The projections are preferably in the form of striations which are oriented in the manner of impellers of a pump in the area between the center of the disc plates and their peripheries. Instead, the projections may assume the form of individual hooks whereby the facing surfaces are similar to rasps.

Figure 2:
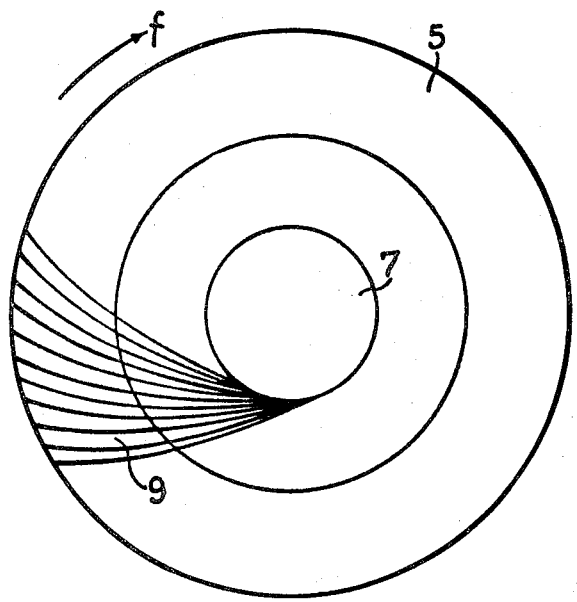
FIG. 2 is a sectional view taken along the line 2—2 of FIG. 1 showing the striated plate of the rotor.
Figure 1:
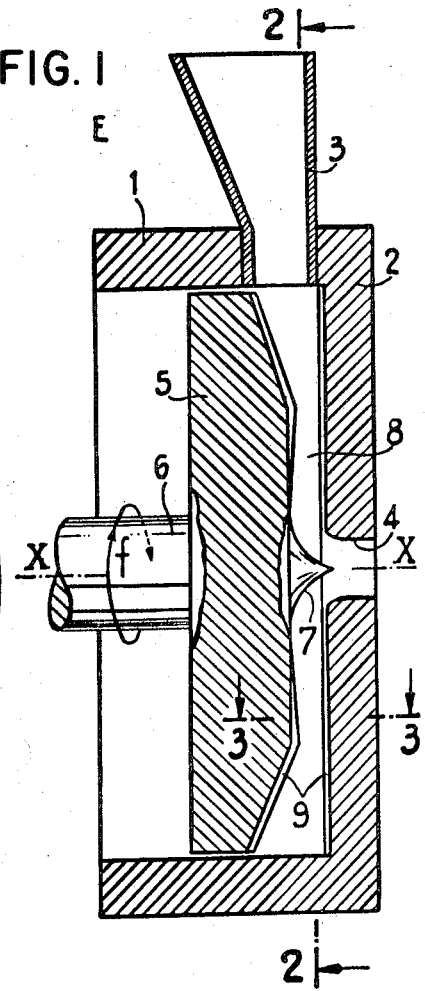
Figure 3:
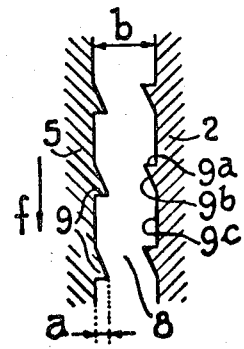
FIG. 3 is a sectional view taken along the line 3—3 of FIG. 1 but on an enlarged scale.

With reference now to the modification of the invention shown in FIGS. 1 to 3, the extruder E is formed of a stationary cylindrical body having a horizontal axis X — X and formed with a cylindrical cavity defined by a cylindrical side wall 1 and a bottom wall 2 which represents the stator. Adjacent the bottom wall 2, the side wall is provided with a radial feed opening which receives a feed hopper 3 for the introduction of plastic material in powdered, pellet or particulate form into the gap between the plates. The stator is provided with a through-extending axial opening or die 4 through which the plastic material is extruded.

A rotor 5, in the form of a disc plate, is mounted on the end of shaft 6 for rotational movement in the cylindrical cavity about the axis X — X. The shaft and rotor are revolved by conventional means, such as a driving motor, belt drive or the like (not shown). Projecting axially from the face of the rotor, in the direction of the stator, is an extension 7 of conical or concave bell shape in outer contour which conforms somewhat to the curvilinear entrance portion of the die opening 4 and which extends across the gap with the tip extending to and preferably partially into the die opening to guide the plastic material for smooth flow from between the plates into the die.

The stator 2 and rotor 5 have the general shape of disc plates spaced one from the other to define a gap 8 therebetween.

In accordance with a preferred modification of the invention, both the stator 2 and the rotor 5 are formed with projections or abutments 9 on their opposite faces in which the projections have the profile in cross-section of a hook which, as illustrated in FIG. 3, comprises a leading portion which extends as an abutment 9a substantially perpendicularly from the face of the stator or rotor and a sloped or inclined trailing portion 9b which extends rearwardly from the outer edge of the abutment to the face of the stator or rotor with a flat spacing 9c between adjacent abutments.

The flat spacing 9c conforms to the facing of the stator or rotor from which the width $b$ of the gap 8 can be measured. The crest or height $a$ of the projections, with regard to the spacing 9c, is somewhat less than the width of the gap 8 so that a substantial clearance is provided between the crest of the stator and the rotor.

The abrupt wall 9a of the projections 9 on the rotor 5 face in the direction of rotation of the rotor, as indicated by the arrow $f$ in FIG. 3. The corresponding abrupt walls 9a of the stator face in the opposite direction.

In the described modification, the abutments 9 are in the form of striae which radiate spirally outwardly from the central portion of the stator or rotor to the periphery, as illustrated in FIG. 2. The striae may be bent or formed with intercepts to faciliate machining. In the preferred practice, the projections 9 gradually decrease in height from the outer peripheral portion inwardly towards the center with the height at the center decreasing to about zero.

In operation, the material to be extruded, such as polyvinyl chloride in granular, pellet or powder form, is introduced from the feed hopper 3 through the feed opening into the gap 8 between the stator 2 and rotor 4 with the material being drawn into the gap in response to rotational movement of the rotor in the direction of the arrow 7. The stator and rotor are heated as by electrical resistance heaters or by a heat exchange fluid circulated through suitable passages in the stator or rotor, or by other conventional heating means, the elements being heated to the desired temperature for the particular plastic material.

The heat softened plastic adheres to the abutment faces of the stator and rotor whereby the material in between is subjected to a shearing action which operates to generate an increase in temperature for reduction of a material to a plastic state and to form the material into a thin cake which fills the gap 8 and is pressed into anchoring engagement with the abutment faces of the stator and rotor. As a result, material confronted by the abrupt walls 9c of the stationary stator 2 remains somewhat motionless while the portion of the cake adjacent the face of the rotor 5 is entrained for rotation at the speed of the rotor. Thus, the core of the plastic material between the faces of the stator and rotor is subjected to a shearing action which contributes to the reduction of the material to a gel or plastic state. The plastic material within the gap is subjected to a centripetal force which compels radial flow towards the center of the disc plates and through the opening 4 for extrusion from the die. Thus the abutments militate against relative sliding movement between the cake of plastic material and the faces of the stator and rotor thereby to insure maximum effect of the shearing forces as well as the centripetal movement of the plastic material. As a result, continuous production at a uniform rate is achieved with uniformity in temperature and composition through the crosssection of the extrusion. The extrusion is thus well adapted to molding, as by blowing and the like.

Figure 5:
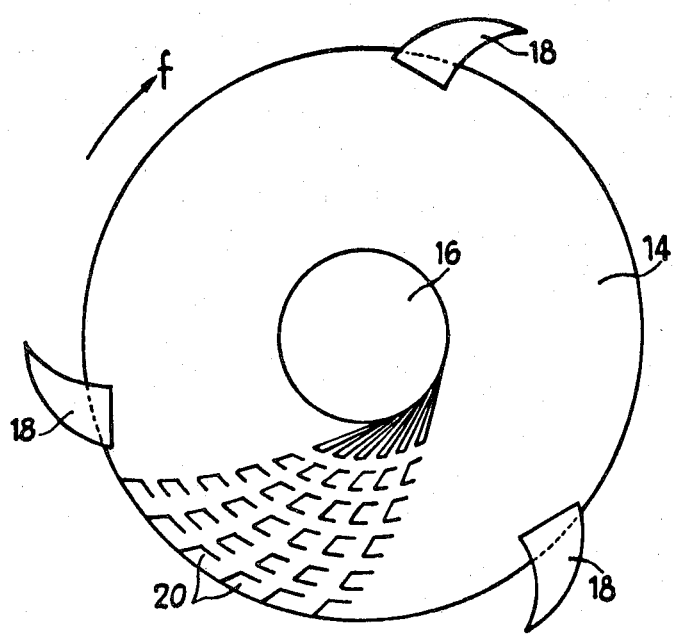
FIG. 5 is a sectional view of the rotor taken along the line 5—5 of FIG. 4.
Figure 4:
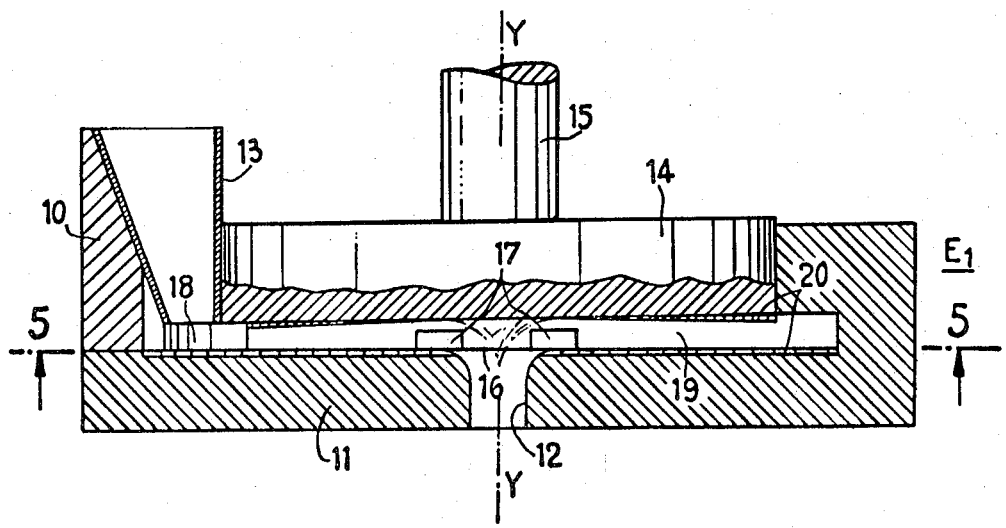
FIG. 4 is a sectional elevational view of a modification in the extruder of this invention.

In the modification shown in FIGS. 4 and 5, the extruder $E_1$ is suitably formed with a stationary cup shaped member 10 in the form of a cylindrical section having a side wall and a bottom wall, the latter of which represents the disc plate of the stator 11 having a die opening 12 in the form of a passage through an axial portion of the stator with a curvilinear bell shaped entrant portion to facilitate the extrusion of the plastic material therethrough. The feed hopper 13 is fixed to a peripheral portion of the side wall 10 for feed of material in a direction parallel to the axis Y — Y with the feed opening opposite the inner face of the stator and in spaced relationship therefrom to provide a slot therebetween.

The rotor 14 is similar to the rotor shown in FIG. 1 with a disc plate secured onto the end of a shaft 15 for rotational movement about an axis Y — Y in spaced parallel relation to the stator to define a gap 19 therebetween and with the rotor having an axial projection 16 of conical shape, or with an outer contour corresponding to the entrant portion of the die opening and with the tip extending substantially across the gap and preferably a short distance into the die opening to guide the plastic material for turning movement into the die opening. The rotor shaft is connected for rotational movement by a motor or other suitable driving means. Unlike the extruder E, the stator 11 is provided with a plurality of blades 17 which project from the face of the stator adjacent the die opening 12 and the rotor is provided with blades 18 which extend radially outwardly in circumferentially spaced apart relation from the peripheral portion of the rotor with the blades 18 having a width less than the spaced relationship between the feed opening and the face of the stator and a length to extend at least to the outer end of the feed opening to sweep the material flowing through the feed opening into the gap 19. For this purpose, the leading edge of the blades is formed to curvilinear shape with the outer edge leading the remainder to operate as scoops for displacement of the material inwardly into the space between the rotor and stator in response to rotational movement. The blades 17 are dimensioned to have a height less than the cross-section of the gap so as not to interfere with the rotor during its rotational movement.

In the modification shown in FIGS. 4 and 5, the inner faces of the rotor and stator are covered with projections or abutments which, instead of being formed of continuous ridges of spiral shape, comprise radially separated segments which operate as individual hooks and provide the characteristics of rasps on the surface of the plates. The profile of the abutments are somewhat similar to the spiral projections of the prior modification in that they are formed with an abrupt wall at their leading edge and then taper gradually downwardly to the face of the respective disc plate with the height of the abutments being greatest at the outermost abutments while decreasing gradually towards the center. The abutments can be arranged in a spiral pattern in the respective faces of the stator and rotor but with the maximum height of the abutments less than one-half the width of the gap to provide a spaced relation between the abutments of the rotor and stator. The abutments terminate short of the bladed section 17 of the stator, the latter of which may be dimensioned to have a height corresponding to the spaced relationship between the stator and rotor and preferably slightly less.

The operation of extruder $E_1$ is similar to that of the extruder E with the exception that the blades 18 scrape the peripheral walls of the stator for displacement of material into the gap. The abutments function in the same manner to prevent slippage between the plastic material and the faces of the respective stator and rotor. It will be understood that a combination of spiral projections and segments or hooks may be used as between the rotor and stator or that one may be formed with ribs and the other with hooks, etc.

Figure 6:
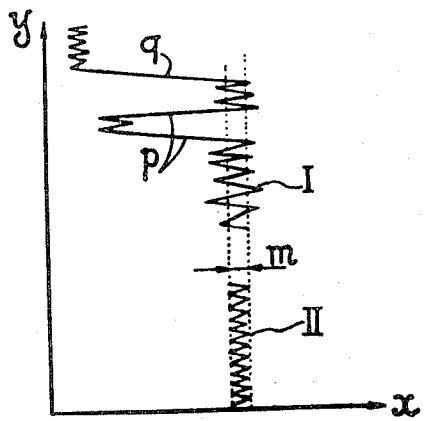
FIG. 6 represents a diagram comparing a known type of extruder with an extruder embodying the features of this invention in which the diagram illustrates power variations measured as a function of time on the rotor.

The following example is given by way of illustration of the efficiencies derived from the practice of this invention:

The diagram in FIG. 6 represents the variation of power as measured on the rotor as a function of time.

The axis Y identifies the time and the axis X represents the power. Line 1 illustrates the operation of an extruder of the type shown in FIGS. 4 and 5 but without the abutments. Line 2 illustrates the operation of an extruder of the type shown in FIGS. 4 and 5, embodying the features of this invention.

As illustrated, the power oscillates about an average value. The amplitude of the oscillation is a measure of power stability with the smaller amplitude indicating the greater stability in the operation of the extruder. It will be seen that the amplitude in line 2 is much less than that of line 1. This clearly indicates that the extruder embodying the features of this invention is characterized by greatly improved operation and stability.

Further, it will be noticed that in line 1 there is a noticeable drop in power followed by a great increase, as indicated by the letter *p*. This rise and fall in power, identified by the applicant as disengagements, results from slippage between the plastic material and the plate. Such slippage is intermittent and of a temporary nature. Nevertheless, the result is a slightly irregular operation of the extruder and variation of the material extruded such that a machine of the type illustrated is incapable of industrial use.

It will also be noted in line 1 that the power drop is usually greater than the subsequent increase in power whereby the measurable power oscillates about a lower average value than the preceding average. This drop in power level corresponds to a definite slippage of plastic material which is no longer extruded. As a result, the production decreases until material is no longer extruded, a condition referred to as stopping. No phenomenon of this character is experienced with an extruder embodying the features of this invention, as illustrated by line 2.

It has been found that the disengagement phenomenon or momentary drop in power, and consequently the momentary fall in output, occurs for working parameters below the following values:

| rotor speed | 120 r.p.m. |
| temperature of the fluid heatd plate | 175°C |
| width *b* of the gap | 7 mm |

For values higher than the above, representing more severe working conditions, tried for the purpose of increasing output, disengagement and stopping becomes more frequent with inevitable fall in power. The foregoing applies to the conventional extruder.

On the other hand, with an extruder embodying the plate structure of the invention, for working parameters below the aforementioned values, the amplitude of the power oscillations is merely equivalent to that of the known types of extruders but without disengagements. With working parameters higher than the values mentioned above, an extruder embodying the features of this invention runs steadily, without disengagements, and without slippage and with power oscillation amplitudes or stability well below the amplitude of the oscillations of presently known extruders.

The following is a table of comparison for a number of parameters, giving the comparative values of amplitude of oscillations and output of an extruder of the known type compared with the same extruder embodying the abutments of this invention:

COMPARATIVE TABLE

| Regulation parameters | | | Amplitude of Power oscillation in mm. | | Differences of amplitude I-II/I × 100 or gain of stability % | Outputs and output regularity of material extruded or extrudate in kg/h | | |
|---|---|---|---|---|---|---|---|---|
| Rotor speed r.p.m. | plate heating oil temperature °C | gap width mm. | FIG. 6 line I extruder of a known type | FIG. 6 line II extruder according to the invention | | I extruder of a known type | II extruder according to the invention | Gain II-I |
| | | | | | | irregular output | regular output | |
| 100 | 125 | 7 | 8 | 4 | 50 | 44.3 | 49.6 | 5.3 |
| 120 | 150 | 7 | 8 | 4 | 50 | 54.6 | 59.5 | 4.9 |
| 120 | 175 | 7 | 10 | 2 | 80 | 54.1 | 61.0 | 6.9 |
| 140 | 200 | 7 | 9 | 5 | 44 | 57.6 | 72.8 | 5.2 |
| 160 | 100 | 7 | 14 | 5 | 65 | 76.5 | 81.8 | 5.3 |

The table shows the gain in power and stability which is experienced with extruders embodying the features of this invention, as evidenced by amplitude reduction of power oscillation. The table does not show the disengagements or stoppages which occurred for the extruder which does not embody the features of this invention. However, it does indicate the irregularity of output while the extruder representing the practice of this invention gives regular output.

It will be understood that changes may be made in the details of construction, arrangement and operation without departing from the spirit of the invention. For example, the hooks of the extruder of FIGS. 4 and 5 may be used in the horizontal extruders of FIGS. 1 and 3 and vice versa. Instead of the abutments having the hook shape shown in FIG. 3, they may be cylindrical, conical, oval, or the like shapes in cross-section.

I claim:

1. A disc plate extruder for plastic material having a rotor and stator in the form of disc plates with their facing surfaces in spaced parallel relation to provide a gap in between, means for rotating the rotor relative the stator about its axis, a die opening through the axial portion of the stator through which the plastic material is extruded, and means for introducing material to be extruded into the gap between the disc plates, the improvement comprising projections extending from the facing surfaces of the stator and rotor into the gap, each having a height which, when added together, is less than the width of the gap to provide a clearance between the crests of the projections during rotational movement of the rotor, said projections extending from about the axial portions to about the peripheral portions of the stator and rotor, with the cross sectional shape of the rotor projections comprising a leading portion in the form of a wall facing forwardly in the direction of rotational movement of the rotor and which extends substantially perpendicularly from the surface of the rotor to a crest and a trailing portion which tapers rearwardly downwardly from the crest to the surface of the rotor for mergence therewith in spaced relation from the next projection to provide a flat surface portion of the rotor therebetween, and with projections in the stator corresponding in shape with the projections in the rotor, but facing in the opposite direction.

2. An extruder as claimed in claim 1 in which the projections are formed with intercepts which extend from the axial portion of the stator and rotor towards their peripheries.

3. An extruder as claimed in claim 1 in which the projections in the rotor and stator define a curvilinear path from the axial portion to the peripheral portions of the stator and rotor.

4. An extruder as claimed in claim 1 in which the projections extend curvilinearly from the axial portion of the stator and rotor toward their peripheries.

5. An extruder as claimed in claim 1 in which the projections extend in a spiral path from the axial portions of the rotor and stator to their peripheries.

6. An extruder as claimed in claim 5 in which the projections are continuous in each of the stator and rotor.

7. An extruder as claimed in claim 5 in which the projections are discontinuous segments to provide a surface in each of the stator and rotor having the characteristics of a rasp.

8. An extruder as claimed in claim 1 in which the height of the projections is greatest at their outer peripheral portions and a minimum at their adjacent axial portions.

9. An extruder as claimed in claim 8 in which the height of the projections diminishes gradually from their outer peripheral portions to their inner axial portions.

10. An extruder as claimed in claim 8 in which the height of the projections diminishes gradually to zero in the axial portion of the plate.

11. An extruder as claimed in claim 1 which includes feed means having a feed opening communicating with the gap between the plates and located beyond the periphery of the rotor, and blades extending radially outwardly from circumferentially spaced apart portions of the rotor to engage material introduced by the feed means for displacement into the gap between the disc plates.

12. An extruder as claimed in claim 11 in which the feed means introduces the material in a direction parallel to the axis of the rotor with the feed opening spaced from the stator to provide a spaced relationship therebetween and in which the blades extend into the area between the feed opening and the stator.

13. An extruder as claimed in claim 12 in which the blades have a curvilinear leading edge with the outer end forwardmost in the direction of turning movement of the rotor.

14. An extruder as claimed in claim 1 which includes blades extending from the face of the stator into the gap between the stator and rotor in the area adjacent the axial opening and in which the blades are dimensioned to have a height which is no greater than the width of the gap.

15. An extruder as claimed in claim 14 in which the projections in the face of the stator terminate short of the blade section.

* * * * *